INVENTOR.
DEODAT CLEJAN

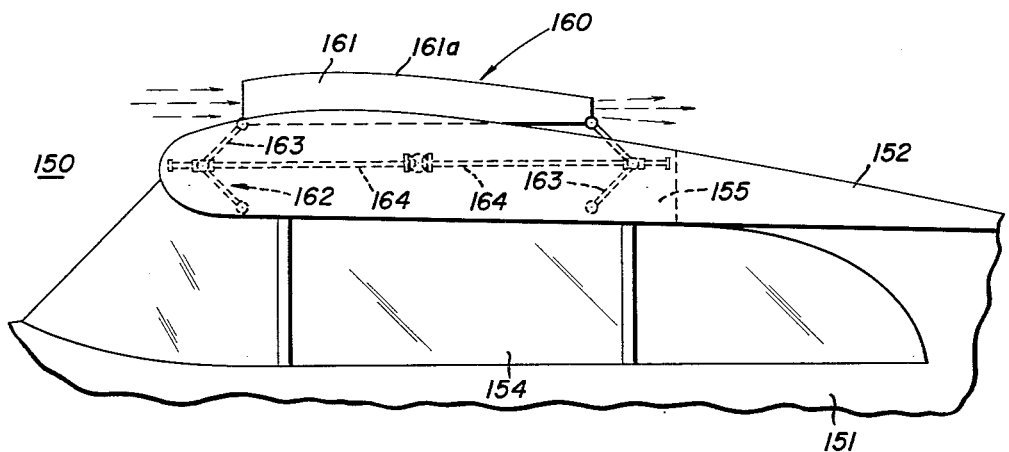
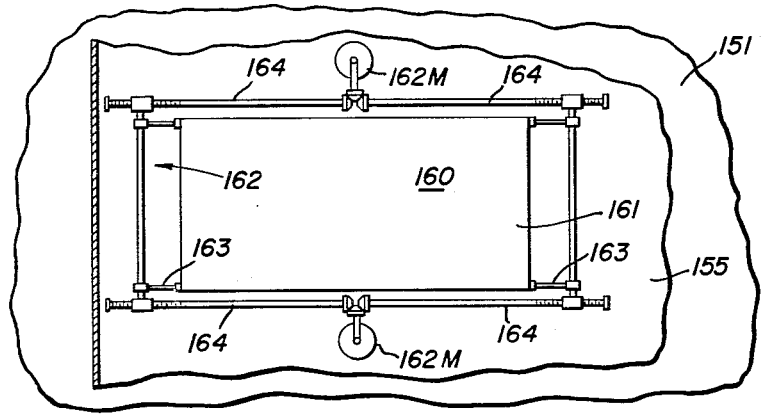
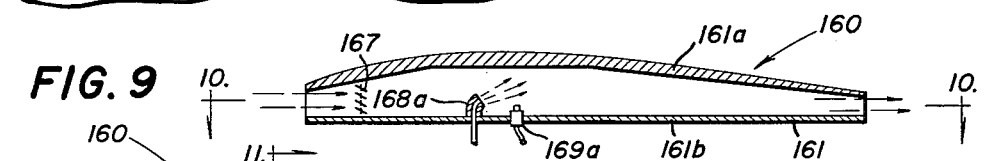
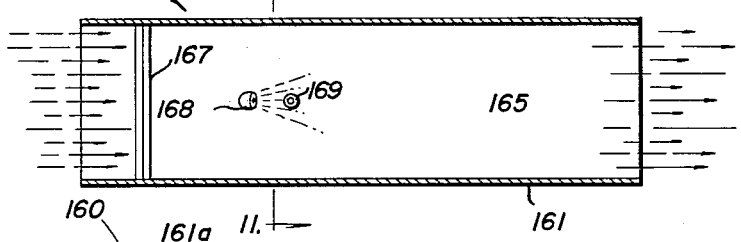
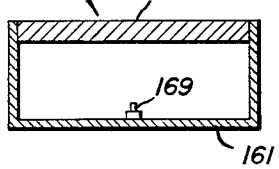

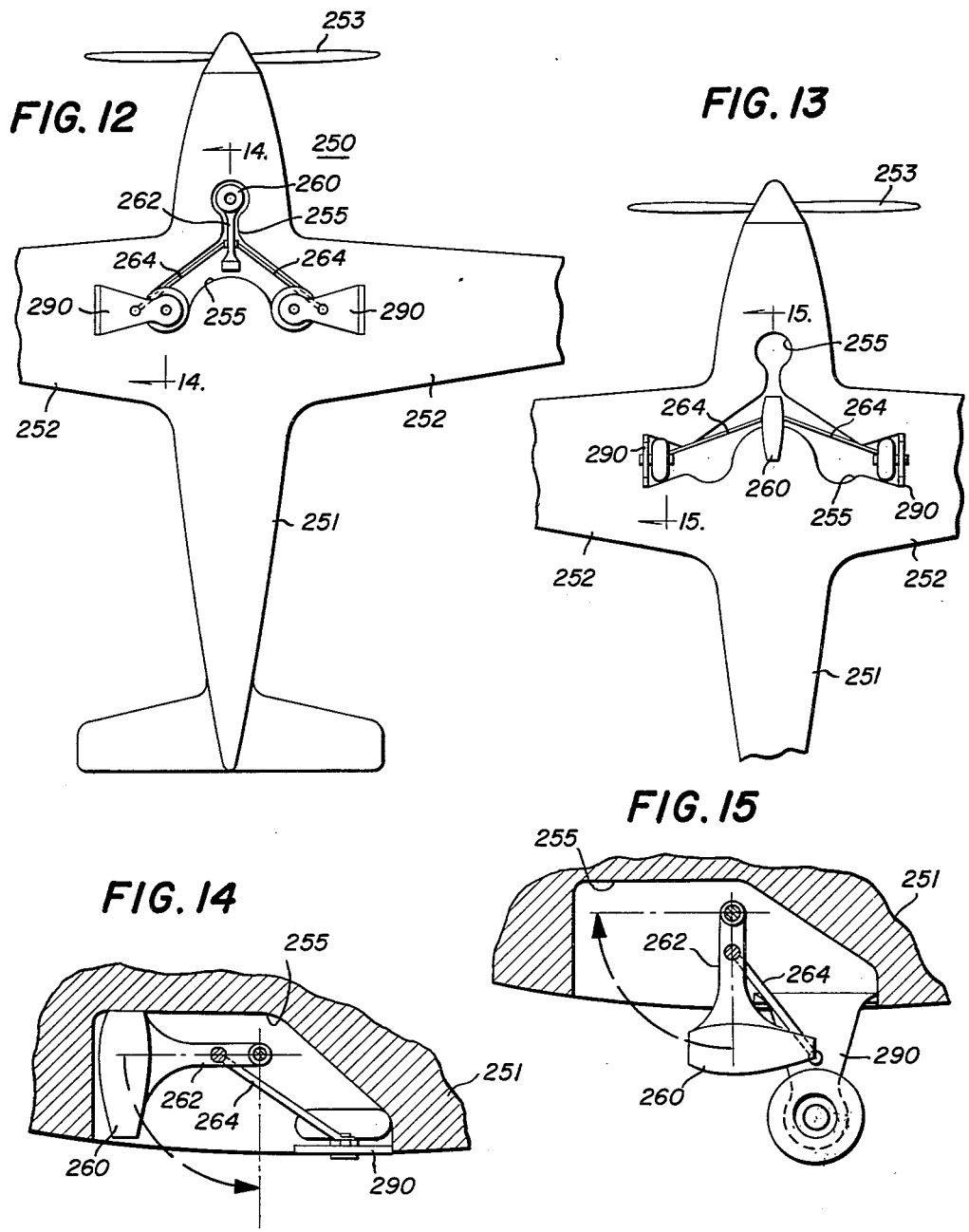

United States Patent Office 3,134,561
Patented May 26, 1964

3,134,561
AIRPLANES PROVIDED WITH RETRACTABLE AUXILIARY ENGINES OF THE PULSE JET TYPE
Deodat Clejan, 1400 N. Lake Shore Drive, Chicago, Ill.
Filed Dec. 26, 1961, Ser. No. 161,872
19 Claims. (Cl. 244—58)

The present invention relates to airplanes provided with retractable auxiliary engines of the pulse jet type, and more particularly to such airplanes that are normally operated by propellers driven by main engines of any suitable type.

An airplane operated by a propeller driven by a single engine of a conventional type is by far the most economical aircraft to operate and to maintain and is altogether the easiest aircraft to fly and to maneuver. However, this airplane is subjected to the hazard that in the event of engine failure, the pilot has great difficulty in making a safe landing of the aircraft since the aircraft quickly loses its flight speed and its altitude.

Accordingly, it is a general object of the present invention to provide in an airplane normally operated by a propeller driven by a main engine of any suitable type, an auxiliary engine of the pulse jet type that can be brought quickly into operation in the event of failure of the main engine, whereby the pilot may maintain the flight speed and the altitude of the airplane long enough to effect a safe landing of the aircraft.

Another object of the invention is to provide in an airplane of the type described, an improved mounting arrangement for the auxiliary engine, whereby the auxiliary engine is readily movable between storage and active positions, wherein the auxiliary engine in its storage position is disposed in a pocket provided in the airplane and out of the air stream of the airplane in flight, and wherein the auxiliary engine in its active position is disposed out of the pocket mentioned and in the air stream of the airplane in flight.

Another object of the invention is to provide in an airplane of the type described, an improved arrangement of the casing of the auxiliary engine so that the top wall thereof provides an auxiliary flight surface that materially assists the main flight surfaces provided by the wing structure of the airplane in maintaining the lift of the aircraft in flight.

A further object of the invention is to provide in an airplane of the type described, an improved interlock between the extensible-retractable landing gears of the aircraft and the auxiliary engine so that the auxiliary engine is moved into its storage position simultaneously with the retraction of the landing gears and so that the auxiliary engine is moved into its active position simultaneously with the extension of the landing gears.

Further features of the invention pertain to the particular arrangement of the elements of the aircraft, whereby the above-outlined and additional operating features thereof are attained.

The invention, both as to its organization and method of operation, together with further objects and advantages thereof, will best be understood by reference to the following specification, taken in connection with the accompanying drawings, in which:

FIG. 7 is a greatly enlarged fragmentary side elevational view of an airplane of the high mono-wing type incorporating a retractable auxiliary engine of the multisection pulse jet type;

FIG. 8 is a greatly enlarged fragmentary plan view of the top central portion of the airplane as shown in FIG. 7;

FIG. 9 is a greatly enlarged vertical sectional view of the auxiliary engine incorporated in the airplane as shown in FIG. 7;

FIG. 10 is a greatly enlarged horizontal sectional view of the auxiliary engine, this view being taken in the direction of the arrows along the line 10—10 in FIG. 9;

FIG. 11 is a greatly enlarged vertical sectional view of the auxiliary engine, this view being taken in the direction of the arrows along the line 11—11 in FIG. 10;

FIG. 12 is a fragmentary bottom view of an airplane of the low mono-wing type and incorporating both retractable landing gears and a retractable auxiliary engine of the pulse jet type, the landing gears and the auxiliary engine being illustrated in their retracted positions;

FIG. 13 is another fragmentary bottom view of the airplane as shown in FIG. 12, the landing gears and the auxiliary engine being illustrated in their extended positions;

FIG. 14 is a greatly enlarged fragmentary vertical sectional view of the airplane, this view being taken in the direction of the arrows along the offset line 14—14 in FIG. 12; and FIG. 15 is a greatly enlarged fragmentary vertical sectional view of the airplane, this view being taken in the direction of the arrows along the offset line 15—15 in FIG. 13.

Figure 1:
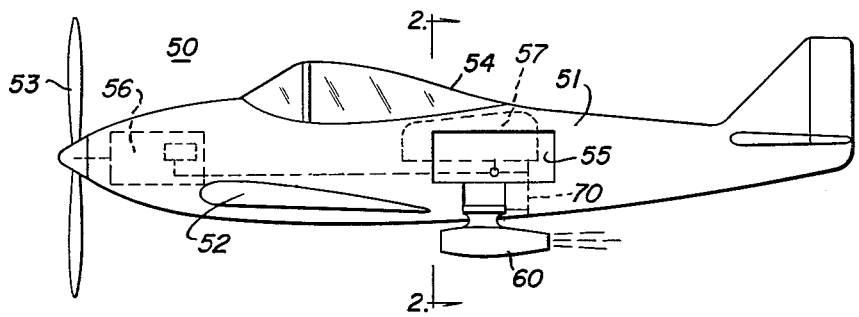
FIGURE 1 is a side elevational view of an airplane of the low mono-wing type incorporating a retractable auxiliary engine of the pulse jet type, and embodying the present invention.
Figure 2:
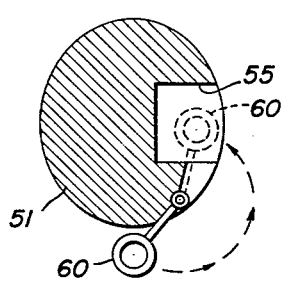
FIG. 2 is a vertical sectional view of the airplane, taken in the direction of the arrows along the line 2—2 in FIG. 1.
Figure 3:
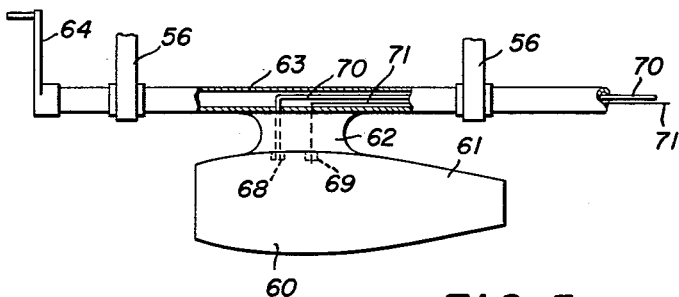
FIG. 3 is an enlarged side elevational view, partly broken away, of the mounting arrangement for the auxiliary engine.

Referring now to FIGS. 1 to 3, inclusive, of the drawings, the airplane 50 there illustrated and embodying the features of the present invention is of the low mono-wing type comprising an elongated longitudinally extending fuselage 51 and a pair of oppositely laterally extending wing sections 52 respectively carried by the opposite sides of the fuselage 51 and disposed adjacent to the forward central portion thereof, the wing sections 52 being located in a substantially horizontal plane passing through the lower portion of the fuselage 51. The front portion of the fuselage 51 houses a main power plant or engine of any conventional type, such as a piston engine, a turbo-jet-prop engine, etc., indicated at 56, that drives a propeller 53 disposed at the extreme front end of the fuselage 51. Also the central portion of the fuselage 51 defines a cockpit 54 located centrally between the wing sections 52 and in substantially lateral alignment therewith; and in this central portion of the fuselage 51, there is arranged a fuel tank, indicated at 57, that contains a suitable fuel, such as gasoline and that is suitably connected to the main engine 56.

Further, the airplane 50 comprises an auxiliary power plant or engine 60 of the pulse jet type that is suitably mounted upon the lower central portion of the fuselage 51 at the port side thereof and just rearwardly of the corresponding wing section 52; which auxiliary engine 60 is pivotably movable between storage and active positions with respect to the fuselage 51. The auxiliary engine 60 in its storage position is disposed in a pocket 55 provided in the adjacent port side of the fuselage 51 and out of the air stream of the airplane 50 in flight, the storage position of the auxiliary engine 60 in the pocket 55 being indicated in dotted lines in FIG. 2. The auxiliary engine 60 in its active position is disposed out of the pocket 55 and in the air stream of the airplane 50 in flight, the active position of the auxiliary engine 60 being illustrated in full lines in FIGS. 1 and 2. More particularly, the auxiliary engine 60 in its active position, as shown in FIGS. 1 and 2, is located below the fuselage 51 and the wing sections 50 and is positioned rearwardly of the wing sections 52 and substantially in a vertical plane passing through the longitudinal center line of the fuselage 51.

As best illustrated in FIG. 3, the auxiliary engine 60 comprises an elongated longitudinally extending tubular casing 61 that is rigidly mounted upon an associated longitudinally extending tubular trunnion bar 63 that, in turn, is pivotally mounted upon suitable bracket structure 56 carried by the fuselage 51. A crank arm 64 is rigidly secured to the forward end of the trunnion bar 63; which crank arm 64 comprises a part of the actuating mechanism, not shown, that is incorporated in the fuselage 51 and that is selectively operative to rotate the trunnion bar 63 and consequently to pivot the auxiliary engine 60 between its storage and active positions in an obvious manner. The details of the mechanism, of which the crank arm 64 comprises a part, have not been illustrated in the interest of brevity, since such mechanisms, usually of the hydraulical motor actuated type, are well-known in this art.

Alternatively, the mechanism, of which the crank arm 64 comprises a part, may be of any suitable manually actuated type.

Figure 6:
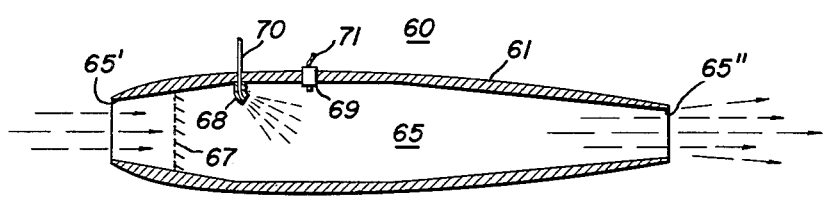
FIG. 6 is an enlarged vertical sectional view, taken through the auxiliary engine incorporated in the airplane of FIGS. 1 and 2.

Referring now to FIG. 6, the elongated tubular casing 61 of the auxiliary engine 60 defines therein an elongated tubular compression-explosion chamber 65 that communicates with a forwardly facing air inlet opening 65′ provided in the front end of the casing 61 and that communicates with a rearwardly facing gas outlet opening 65″ provided in the rear end of the casing 61. Also the casing 61 houses in the front portion thereof the usual vane or shutter structure 67; and further the front portion of the casing 61 is provided with a fuel supply nozzle 68 and an ignition device 69. As best illustrated in FIG. 3, the fuel supply nozzle 68 is operatively connected to an associated fuel line 70 that may be housed in the tubular trunnion bar 63; and similarly, the ignition device 69 is operatively connected to an associated electric cable 71 that may be housed in the tubular trunnion bar 63. Of course, the fuel line 70 is connected to a fuel tank, not shown, that is housed in the fuselage 51 and that contains a suitable fuel, such as a light petroleum liquid; and similarly, the electric cable 71 is connected to a source of electric power supply, not shown, that is housed in the fuselage 51.

Alternatively, the fuel tank 57 for the main engine 56 may, in fact, comprise the fuel tank for the auxiliary engine 60, since the auxiliary, for engine 60 may be readily operated from the same source of fuel supply as the main engine 56.

In the normal operation of the airplane 50, the same is operated by the propeller 53 driven by the main engine 56, and the auxiliary engine 60 occupies its normal storage position disposed in the pocket 55 provided in the adjacent port side of the fuselage 51. In the event of mechanical failure of the main engine 56, the pilot immediately operates the mechanism, of which the crank arm 64 forms a part, whereby the auxiliary engine 60 is pivoted or moved from its storage position into its active position and placed in operation so as to provide power to sustain the flight speed and the altitude of the airplane 50.

The operation of the auxiliary pulse jet engine 60 is entirely conventional; and specifically, a quantity of air is first taken into the air inlet opening 65′ provided in the front end of the casing 61 due to the forward movement of the casing 61 relative to the air, since the airplane 50 is at flight speed at this time. The air is compressed in the casing 51 by virtue of the forward movement of the auxiliary engine 60; whereupon a quantity of fuel, in atomized condition, is supplied by the fuel nozzle 68 into the compression-explosion chamber 65 defined within the casing 61. At this time, the ignition device 69 is operated, whereby an explosion occurs in the compression-explosion chamber 65, with the result that the vane or shutter structure 67 is momentarily driven or operated into its closed position so that the reaction products of combustion are expelled from the compression-explosion chamber 65 through the gas outlet opening 65″ in the rear end of the casing 61 in order to produce a forward impulse or thrust by the auxiliary engine 60. As the force of the explosion subsides, the vane or shutter structure 67 is again operated into its open position, whereby fresh air is again admitted through the air inlet opening 65′ into the compression-explosion chamber 65, with the result that the combustion products are swept from the compression-explosion chamber 65 through the gas outlet opening 65″. Thus a fresh supply of air is admitted into the compression-explosion chamber 65; whereby the fuel supply nozzle 68 and the ignition device 69 may be reoperated in order to produce another impulse or cycle of operation of the auxiliary engine 60, in a conventional manner. Thus the auxiliary engine 60 is operative to produce forward impulses or thrusts, thereby to urge the airplane 50 forwardly so as to maintain the flight speed and the altitude thereof, whereby the pilot may maneuver the airplane 50 to the nearest landing field and make an appropriate safe landing on the airplane 50 thereupon in the usual manner, under the power of the auxiliary engine 60.

In the airplane 50, the location of the auxiliary engine 60 in its active position in the substantially vertical plane passing through the longitudinal center line of the fuselage 51 is very important, since the propeller 53 is also located in this vertical plane mentioned and forwardly of the auxiliary engine 60, whereby the backwash of air from the propeller 53 is directed into the air inlet opening 65′ in the front end of the casing 61 of the auxiliary engine 60. Accordingly, this arrangement has a tendency to compress somewhat the fresh air that is supplied into the air inlet opening 65′ provided in the front end of the casing 61 of the auxiliary engine 60.

The landing gear that is incorporated in the airplane 50 is not illustrated in the interest of simplification, but it will be understood that the landing gear contemplated is of the conventional retractable type, whereby the landing gear mentioned in its extended position projects sufficiently downwardly below the fuselage 51 and the auxiliary engine 60, that the propeller 53 and the auxiliary engine 60 are not damaged in the landing operation; which arrangement of the landing gear mentioned is entirely conventional.

Figure 4:
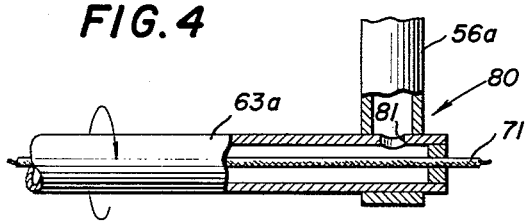
FIG. 4 is a greatly enlarged side elevational view, partly broken away, of the mounting arrangement and illustrating a fuel control valve that may be incorporated in the fuel supply system of the auxiliary engine.
Figure 5:
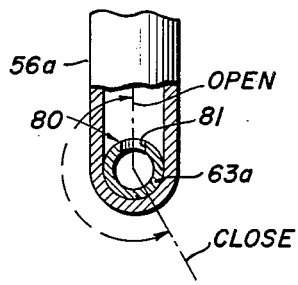
FIG. 5 is a greatly enlarged end elevational view of the mounting and fuel control valve arrangements, as shown in FIG. 4.

Referring now to FIGS. 4 and 5, a modification of the construction and arrangement of the fuel supply system for the auxiliary engine 60 is there illustrated; which arrangement includes a fuel valve mechanism 80 incorporated in the fuel line 70 extending to the auxiliary engine 60. More particularly, in this arrangement, the tubular trunnion bar 63a and the associated bracket structure 56a (respectively corresponding to the elements 63 and 56 in FIG. 3) comprise the coordinate elements of the valve mechanism 80; and specifically, an opening 81 is formed in the side of the tubular trunnion bar 63a that selectively communicates with the interior of the tubular bracket structure 56a. In the arrangement, the hole 81 communicates with the interior of the bracket structure 56a when the trunnion bar 63a is rotated to pivot the auxiliary engine 60 into its active position, thereby to open the fuel valve 80. On the other hand, the hole 81 is closed with respect to the interior of the bracket structure 56a when the trunnion bar 63a is rotated to pivot the auxiliary engine 60 into its storage position, thereby to close the fuel valve 80. Accordingly, in this arrangement of FIGS. 4 and 5, the movement of the auxiliary engine 60 into its active position automatically opens the valve mechanism 80 included in the fuel supply system extending to the auxiliary engine 60; whereas the movement of the auxiliary engine 60 into its storage position automatically closes the valve mechanism 80 included in the fuel supply system extending to the auxiliary engine 60.

Referring now to FIGS. 7 and 8, the modified form of the airplane 150 there illustrated and embodying the features of the present invention is of the high mono-wing type comprising an elongated longitudinally extending fuselage 151 and a pair of oppositely laterally extending wing sections 152 respectively carried by the opposite sides of the fuselage 151 and disposed adjacent to the central portion thereof, the wing sections 152 being located in a substantially horizontal plane passing through the upper portion of the fuselage 151. The front portion of the fuselage 151 houses a main power plant or engine of any conventional type, not shown, that drives a propeller, not shown, disposed at the extreme front end of the fuselage 151 and along the longitudinal center line thereof. Also the central portion of the fuselage 151 defines a cockpit 154 located centrally between the wing sections 152 and in substantial lateral alignment therewith.

Further, the airplane 150 comprises an auxiliary power plant or engine 160 of the pulse jet type that is suitably mounted upon the upper central portion of the fuselage 151 and in substantial lateral alignment with the wing sections 152; which auxiliary engine 160 is movable in the vertical direction between storage and active positions with respect to the fuselage 151. The auxiliary engine 160 in its stored position is disposed in a pocket 155 provided in the upper central portion of the fuselage 151 and out of the air stream of the airplane 150 in flight. The auxiliary engine 160 in its active position is disposed out of the pocket 155 and in the air stream of the airplane 150 in flight, the active position of the auxiliary engine 160 being illustrated in FIG. 7. More particularly, the auxiliary engine 160 in its active position, as shown in FIG. 7, is located above the top central portion of the fuselage 151 and above the adjacent top surfaces of the wing sections 152.

The auxiliary engine 160 comprises a substantially box-like casing 161 that is generally rectangular in plan, as best illustrated in FIG. 9; which casing 161 is suitably mounted upon extensible-retractable mechanism 162 that includes appropriate linkages 163 that accommodate the previously mentioned vertical movement of the auxiliary engine 160 between its storage and active positions. More particularly, this mechanism 162 further includes a plurality of rotatably mounted drive shafts 164 that are operatively connected to the linkages 163, as well as a pair of operating motors 162M; which drive motors 162M may be of any suitable type. The details of the mechanism 162 are substantially conventional; whereby it will be understood that a first operation of the drive motors 162M brings about a first operation of the drive shafts 164, so that the linkages 163 are contacted in order to move the casing 161 of the auxiliary engine 160 into its storage position in the pocket 155 formed in the top central portion of the fuselage 151; and whereby a second operation of the drive motors 162M brings about a second operation of the drive shafts 164, so that the linkages 163 are extended in order to move the casing 161 of the auxiliary engine 160 into its active position out of the pocket 155 formed in the top central portion of the fuselage 151.

Alternatively, the mechanism 162, of which the linkages 163 comprise a part, may be of any suitable manually actuated type.

The substantially box-like casing 161 of the auxiliary engine 160 comprises a substantially rectangular top wall 161a that has a convex outer surface between the leading and trailing edges thereof, as best shown in FIGS. 7 and 9; which top wall 161a is disposed substantially flush with the top surfaces of the wing sections 152 when the casing 161 of the auxiliary engine 160 occupies its storage position in the pocket 155 formed in the top central portion of the fuselage 151; and which top wall 161a is disposed above the top surfaces of the wing sections 152 and in substantial lateral alignment therewith when the casing 161 of the auxiliary engine 160 occupies its active position, as shown in FIG. 7. When the top wall 161a of the casing 161 is disposed substantially flush with the top surfaces of the wing sections 152, with the auxiliary engine 160 in its storage position, the top casing wall 161a cooperates with the top surfaces of the wing sections 152 mutually to define a common flight surface extending over the casing top wall 161a and over the wing sections 152. On the other hand, when the top wall 161a of the casing 161 is disposed above the top surfaces of the wing sections 152, with the auxiliary engine 160 in its active position, the top casing wall 161a defines an auxiliary flight surface extending over the casing top wall 161a and independent of the main flight surfaces respectively extending over the wing sections 152.

As best seen in FIGS. 9 to 11, inclusive, the auxiliary engine 160 is of the fundamental construction of the pulse jet engine 60, as previously described in conjunction with FIG. 6; whereby the auxiliary engine 160 comprises the corresponding elements 165, 168 and 169 that are in this case carried by the bottom wall 161b of the casing 161. Further, the casing 161 houses adjacent to the front end thereof the vane or shutter structure 167 that is utilized in the operation of the auxiliary engine 160 for the purpose previously described.

Again, it is noted that in the normal operation of the airplane 150, the same is operated by its propeller, not shown, driven by its main engine, not shown, and the auxiliary engine 160 occupies its normal storage position disposed in the pocket 155 provided in the top central portion of the fuselage 151. In the event of mechanical failure of the main engine, the pilot immediately operates the motor mechanisms 162M, whereby the auxiliary engine 160 is moved in the vertical direction from its storage position into its active position and placed in operation so as to provide power to sustain the flight speed and the altitude of the airplane 150.

Again, it is noted that in the airplane 150, the source of fuel supply for the auxiliary engine 160 may be the same as that of the main engine, not shown, or alternatively, a separate source of fuel supply for the auxiliary engine 160 may be provided.

Referring now to FIGS. 12 to 15, inclusive, the further modified form of the airplane 250 there illustrated and embodying the features of the present invention is of the low mono-wing type comprising an elongated longitudinally extending fuselage 251 and a pair of oppositely laterally extending wing sections 252 respectively carried by the opposite sides of the fuselage 251 and disposed adjacent to the forward central portion thereof, the wing sections 252 being located in a substantially horizontal plane passing through the lower portion of the fuselage 251. The front portion of the fuselage 251 houses a main power plant or engine of any conventional type, not shown, that drives a propeller 253 disposed at the extreme front end of the fuselage 251 and along the longitudinal center line thereof. Also the central portion of the fuselage defines a cockpit, not shown, located centrally between the wing sections 252 and in substantial lateral alignment therewith. Further, the airplane 250 comprises an auxiliary power plant or engine 260 of the pulse jet type that is suitably mounted upon the lower central portion of the fuselage 251; which auxiliary engine 260 is movable between storage and active positions with respect to the fuselage 251. The auxiliary engine 260 in its storage position is disposed in a pocket 255 provided in the bottom of the fuselage 251 and out of the air stream of the airplane 250 in flight, the storage position of the auxiliary engine 260 in the pocket 255 being illustrated in FIGS. 12 and 14. The auxiliary engine 260 in its active position is disposed out of the pocket 255 and in the air stream of the airplane 250 in flight, the active position of the auxiliary engine 260 being illustrated in FIGS. 13 and 15. More particularly, the auxiliary engine 260 in its active position, as shown in FIGS. 13 and 15, is located below the central portion of the fuselage 251 and is positioned in substantial lateral alignment with the wing sections 252 and substantially in a vertical plane passing through the longitudinal center line of the fuselage 251. The auxiliary engine 260 in its storage position in the pocket 255 is positioned somewhat forwardly of the wing sections 252 and substantially in a vertical plane mentioned passing through the longitudinal center line of the fuselage 251.

Also, the airplane 250 comprises a pair of landing gears 290 respectively pivotally connected to the two wing sections 252, the landing gears 290 being of the extensible-retractable type and of conventional construction. More particularly, the landing gears 290 are respectively movable between storage and active positions with respect to the wing sections 252. When the landing gears 290 occupy their storage positions, as illustrated in FIGS. 12 and 14, they, too, are disposed in the pocket 255 formed in the lower central portion of the fuselage 251, the pocket 255 mentioned having a substantially inverted T-shaped configuration, as clearly illustrated in FIGS. 12 and 13. On the other hand, when the landing gears 290 occupy their extended positions, as illustrated in FIGS. 13 and 15, they are moved out of the pocket 255 into laterally spaced-apart positions disposed on opposite sides of the fuselage 251 and respectively below the wing sections 252. Also, in the extended positions of the landing gears 290, they are disposed below the downward extension of the auxiliary engine 260 in its active position, as clearly illustrated in FIG. 15. Further, the airplane 250 comprises interlock mechanism between the auxiliary engine 260 and the landing gears 290; and more specifically, the arm 262 upon which the auxiliary engine 260 is pivotally mounted is linked by a pair of linkages 264 to the respective landing gears 290. Accordingly, when the auxiliary engine 260 is moved into its storage position, the landing gears 290 are respectively moved into their retracted positions due to the linkages 264 therebetween; and likewise, when the auxiliary engine 260 is moved into its active position, the landing gears 290 are respectively moved into their extended positions due to the linkages 264 therebetween. Accordingly, the airplane 250 may comprise a single motor mechanism, not shown, that is selectively operative simultaneously to actuate the engine 260 between its storage and active positions and to actuate the landing gears 290 between their respective retracted and extended position. The motor mechanism mentioned is not illustrated in the interest of simplicity since such motor mechanisms, usually are of the hydraulically actuated type, are well-known in this art. In fact, the conventional motor mechanism that normally actuates the landing gears 290 between their retracted and extended positions may be utilized for the purpose of simultaneously actuating the auxiliary engine 260 between its storage and active positions by virtue of the linkages 260, as previously described.

Alternatively, the motors for actuating the auxiliary engine 260 and for actuating the landing gears 290 may be separate and independent of each other; and moreover, the auxiliary engine 260 may be actuated by entirely manually operated mechanism, if desired, as previously explained. Of course, it will be understood that when the auxiliary engine 260 and the landing gear 290 are to be independently actuated, the interlocking linkages 264 normally arranged therebetween are removed.

The auxiliary engine 260 is of the pulse jet type and may be substantially identical to the auxiliary engine 60, as previously described in conjunction with FIG. 6.

Furthermore, the source of fuel supply for the auxiliary engine 260 may be the same as that for the main engine, not shown; alternatively, two separate sources of fuel supply may be provided for the two engines mentioned, as previously noted.

In the normal operation of the airplane 250, the same is operated by the propeller 253 driven by the main engine, and the auxiliary engine 260 occupies its normal storage position disposed in the pocket 255 provided in the lower portion of the fuselage 251; and likewise, at this time, the landing gears 290 occupy their retracted position disposed in the pocket 255. In the event of mechanical failure of the main engine, the pilot immediately operates the motor mechanism that is operatively connected mutually to the auxiliary engine 260 and to the landing gears 290, whereby the auxiliary engine 260 is pivoted or moved from its storage position into its active position and simultaneously the landing gears 290 are operated from their retracted positions into their extended positions. At this time, the auxiliary engine 260 is placed in operation so as to provide power to sustain the flight speed of the airplane 250; and in passing, it is mentioned that the general mode of operation of the auxiliary engine 260 of the pulse jet type is substantially the same as that of the auxiliary engine 60 as previously described in conjunction with the airplane 50 of FIGS. 1 and 2.

In view of the foregoing, it is apparent that there has been provided in an airplane normally operated by a propeller driven by a main engine of any conventional type, an improved arrangement of an auxiliary engine of the pulse jet type that can be brought quickly into operation in the event of failure of the main engine, whereby the pilot may maintain the flight speed of the airplane long enough to effect a safe landing of the aircraft. Moreover, in the arrangement, the auxiliary engine is mounted upon the fuselage of the airplane for movements between storage and active positions with respect thereto, wherein the auxiliary engine in its storage position is disposed in a pocket provided in the airplane and out of the air stream of the airplane in flight, and wherein the auxiliary engine in its active position is disposed out of the pocket mentioned and in the air stream of the airplane in flight. Further, the mounting arrangement for the auxiliary engine is exceedingly simple, so that the auxiliary engine may be readily moved between its storage and active positions by simple manually actuated or motor mechanisms of the hydraulically actuated type that is ordinarily employed in actuating the landing gears of the airplane between their retracted and extended positions.

The pulse jet engine is substantially ideally suited for use as the auxiliary engine or emergency power plant in the airplane of the present invention, since it is of exceedingly simple construction and arrangement and has a very low initial cost. Moreover, the normal high rate of fuel utilization of the auxiliary pulse jet engine is of no practical importance, as it is contemplated that this auxiliary engine will be operated only on an emergency basis in the event of mechanical failure of the main engine, as previously explained.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In an airplane including an elongated longitudinally extending fuselage, laterally extending wing structure carried by said fuselage, a main engine carried by said fuselage, and a propeller driven by said main engine; the combination comprising an auxiliary engine of the pulse jet type, and means for mounting said auxiliary engine upon said fuselage for movements with respect thereto between a storage position and an active position, said auxiliary engine in its storage position being disposed in a pocket provided in said fuselage and out of the air stream of said airplane in flight, said auxiliary engine in its active position being disposed out of said pocket and in the air stream of said airplane in flight, said auxiliary engine in its active position being located outwardly of said fuselage and said wing structure and positioned substantially in a vertical plane passing through the longitudinal center line of said fuselage, the operation of said auxiliary engine in its active position being effective to maintain the flight of said airplane.

2. The airplane set forth in claim 1, wherein said auxiliary engine is mounted for pivotal movements between its storage and active positions.

3. The airplane set forth in claim 1, and further comprising motor actuated mechanism for selectively moving said auxiliary engine between its storage and active positions.

4. The airplane set forth in claim 1, and further comprising manually actuated mechanism for selectively moving said auxiliary engine between its storage and active positions.

5. The airplane set forth in claim 1, and further comprising a common tank for supplying fuel to both of said engines.

6. The airplane set forth in claim 1, and further comprising a fuel supply system for said auxiliary engine, a valve arranged in said fuel supply system, and means responsive to movement of said auxiliary engine into its storage position for operating said valve into its closed position and responsive to movement of said auxiliary engine into its active position for operating said valve into its open position.

7. In an airplane including an elongated longitudinally extending fuselage, laterally extending wing structure carried by said fuselage, a main engine carried by said fuselage, and a propeller driven by said main engine; the combination comprising an auxiliary engine of the pulse jet type, and means for mounting said auxiliary engine upon said fuselage for movements with respect thereto between a storage position and an active position, said auxiliary engine in its storage position being disposed in a pocket provided in said fuselage and out of the air stream of said airplane in flight, said auxiliary engine in its active position being disposed out of said pocket and in the air stream of said airplane in flight, said auxiliary engine in its active position being located below said fuselage and said wing structure and positioned substantially in a vertical plane passing through the longitudinal center line of said fuselage, the operation of said auxiliary engine in its active position being effective to maintain the flight of said airplane.

8. In an airplane including an elongated longitudinally extending fuselage, laterally extending wing structure carried by said fuselage, said wing structure being located in a substantially horizontal plane passing through the lower portion of said fuselage, a main engine carried by said fuselage, and a propeller driven by said main engine; the combination comprising an auxiliary engine of the pulse jet type, and means for mounting said auxiliary engine upon said fuselage for movements with respect thereto between a storage position and an active position, said auxiliary engine in its storage position being disposed in a pocket provided in the lower portion of said fuselage and out of the air stream of said airplane in flight, said auxiliary engine in its active position being disposed out of said pocket and in the air stream of said airplane in flight, said auxiliary engine in its active position being located below said fuselage and also below and rearwardly of said wing structure and positioned substantially in a vertical plane passing through the longitudinal center line of said fuselage, the operation of said auxiliary engine in its active position being effective to maintain the flight of said airplane.

9. In an airplane including an elongated longitudinally extending fuselage, laterally extending wing structure carried by said fuselage, a main engine carried by said fuselage, and a propeller driven by said main engine; the combination comprising an auxiliary engine of the pulse jet type, and means for mounting said auxiliary engine upon said fuselage for movements with respect thereto between a storage position and an active position, said auxiliary engine in its storage position being disposed in a pocket provided in the upper portion of said fuselage and out of the air stream of said airplane in flight, said auxiliary engine in its active position being disposed out of said pocket and in the air stream of said airplane in flight, said auxiliary engine in its active position being located above said fuselage and said wing structure and positioned substantially in a veritcal plane passing through the longitudinal center line of said fuselage, the operation of said auxiliary engine in its active position being effective to maintain the flight of said airplane.

10. The airplane set forth in claim 9, wherein said auxiliary engine is mounted for vertical movements between its storage and active positions.

11. In an airplane including an elongated longitudinally extending fuselage, a pair of oppositely laterally extending wing sections respectively carried by the sides of said fuselage, said wing sections being located in a substantially horizontal plane passing through the upper portion of said fuselage, a main engine carried by said fuselage, and a propeller driven by said main engine; the combination comprising an auxiliary engine of the pulse jet type, and means for mounting said auxiliary engine upon said fuselage for movements with respect thereto between a storage position and an active posiiton, said fuselage having a pocket formed in the upper portion thereof and located laterally between said wing sections, said auxiliary engine in its storage position being disposed in said pocket and out of the air stream of said airplane in flight, said auxiliary engine in its active position being disposed out of said pocket and in the air stream of said airplane in flight, said auxiliary engine in its active position being located above said fuselage and also above and in lateral alignment with said wing sections and positioned substantially in a vertical plane passing through the longitudinal center line of said fuselage, the operation of said auxiliary engine in its active position being effective to maintain the flight of said airplane.

12. The airplane set forth in claim 11, wherein said auxiliary engine includes a casing movable therewith and provided with a top wall, said casing top wall in the storage position of said auxiliary engine being disposed substantially flush with the respective top surfaces of said wing sections and cooperating therewith mutually to define a common flight surface extending over said casing top wall and over said wing sections, said casing top wall in the active position of said auxiliary engine being disposed above the respective top surfaces of said wing sections and defining an auxiliary flight surface extending over said casing top wall and independent of the main flight surfaces respectively extending over said wing sections.

13. The airplane set forth in claim 11, wherein said casing top wall has a generally convex configuration between the leading and trailing edges thereof so that the flight surface extending thereover contributes materially to the lift produced by the main flight surfaces respectively extending over said wing sections in the flight of said airplane and regardless of the position of said auxiliary engine.

14. The airplane set forth in claim 11, wherein said fuselage also defines a cockpit located laterally between said wing sections and below said pocket formed in the upper portion thereof.

15. In an airplane including an elongated longitudinally extending fuselage, a pair of oppositely laterally extending wing sections respectively carried by the sides of said fuselage, a pair of laterally spaced-apart landing gears respectively carried by said wing sections, means for mounting said landing gears upon said wing sections for movements with respect thereto between storage and active positions, said landing gears in their storage positions being respectively disposed in a pair of landing gear pockets respectively provided in the lower portions of said wing sections and out of the air stream of said airplane in flight, said landing gears in their active positions being respectively disposed out of said pair of landing gear pockets and in operative landing positions respectively disposed below said wing sections, a main engine carried by said fuselage, and a propeller driven by said main engine; the combination comprising an auxiliary engine of the pulse jet type, means for mounting said auxiliary engine upon said fuselage for movements with respect thereto between a storage position and an active position, said auxiliary engine in its storage position being disposed in an auxiliary engine pocket provided in the lower portion of said fuselage and out of the air stream of said airplane in flight, said auxiliary engine in its active position being disposed out of said auxiliary engine pocket and in the air stream of said airplane in flight, the operation of said auxiliary engine in its active position being effective to maintain the flight of said airplane.

16. The airplane set forth in claim 15, wherein said auxiliary engine in its active position is disposed below said fuselage and above said landing gears in their active positions.

17. The airplane set forth in claim 16, wherein said auxiliary engine in its active position is located substantially in a vertical plane passing through the center line of said fuselage and is positioned between said landing gears in their active positions.

18. The airplane set forth in claim 15, wherein said landing gears are mounted for pivotal movements between their respective storage and active positions, and said auxiliary engine is mounted for pivotal movements between its storage and active positions.

19. In an airplane including an elongated longitudinally extending fuselage, a pair of oppositely laterally extending wing sections respectively carried by the sides of said fuselage, a pair of laterally spaced-apart landing gears respectively carried by said wing sections, means for mounting said landing gears upon said wing sections for movements with respect thereto between storage and active positions, said landing gears in their storage positions being respectively disposed in a pair of landing gear pockets respectively provided in the lower portions of said wing sections and out of the air stream of said airplane in flight, said landing gears in their active positions being respectively disposed out of said pair of landing gear pockets and in operative landing positions respectively disposed below said wing sections, a main engine carried by said fuselage, and a propeller driven by said main engine; the combination comprising an auxiliary engine of the pulse jet type, means for mounting said auxiliary engine upon said fuselage for movements with respect thereto between a storage position and an active position, said auxiliary engine in its storage position being disposed in an auxiliary engine pocket provided in the lower portion of said fuselage and out of the air stream of said airplane in flight, said auxiliary engine in its active position being disposed out of said auxiliary engine pocket and in the air stream of said airplane in flight, and mechanism interlocking the movements of said landing gears and said auxiliary engine so that said elements named are moved simultaneously into their respective active positions and are moved simultaneously into their respective storage positions, the operation of said auxiliary engine in its active position being effective to maintain the flight of said airplane.

References Cited in the file of this patent

UNITED STATES PATENTS

| 2,422,744 | O'Neil | June 24, 1947 |
| 2,506,976 | Tharratt | May 9, 1950 |
| 2,675,196 | Marnay | Apr. 13, 1954 |

FOREIGN PATENTS

| 412,796 | Italy | Feb. 16, 1946 |
| 944,049 | Germany | June 7, 1956 |
| 1,026,012 | France | Jan. 28, 1953 |